United States Patent Office 3,230,225
Patented Jan. 18, 1966

3,230,225
RETARDING POLYMERIZATION OF ETHYLENIC COMPOUNDS
Joseph T. Arrigo, Mount Prospect, Ill., assignor to Universal Oil Products Company, Des Plaines, Ill., a corporation of Delaware
No Drawing. Filed May 18, 1962, Ser. No. 196,003
13 Claims. (Cl. 260—290)

This application relates to a novel method of retarding polymerization of a polymerizable unsaturated substance containing an ethylenic linkage.

Unsaturated compounds containing an ethylenic linkage are formed in various processes. In many manufacturing processes, unsaturated compounds are fractionated or otherwise heated to separate the desired unsaturated compounds from other fractions or from impurities formed during the manufacturing process. After the manufacturing and/or fractionation steps, the unsaturated compounds are stored and/or transported for further processing or use. It is, of course, desirable to retain the unsaturated compounds in monomeric form for such further processing and use and, therefore, polymerization of the unsaturated compounds should be avoided during such fractionation, storage and/or transportation.

It is well-known that unsaturated compounds containing an ethylenic linkage will undergo polymerization upon standing. The tendency toward polymerization is increased during heating. In accordance with the present invention, polymerization of the unsaturated substance is retarded by incorporation therein of a novel polymerization inhibitor.

The present invention is used in retarding polymerization of any polymerizable unsaturated substance containing an ethylenic linkage. In general, the unsaturated substance may be described as a monomeric material containing an ethylenic linkage and, in most cases, has an activating or electronegative group attached to at least one of the disconnected valences of the ethylenic group. The activating or electronegative group increases the polar character of the molecule and may comprise a halogen or an organic group containing a double or triple bond such as vinyl, phenyl, nitrile, carboxy or the like. Included in the monomers are the conjugated diolefins and particularly conjugated diolefins having from 4 to 6 carbon atoms as, for example, 1,3-butadiene, 2,3-dimethyl-1,3-butadiene, isoprene, piperylene, 3-furyl-1,3-butadiene, 3-methoxy-1,3-butadiene, etc. Halodiolefinic compounds include haloprenes such as chloroprene (2 - chloro - 1,3-butadiene), bromoprene, methylchloroprene (2-chloro-3-methyl-1,3-butadiene), etc.

Another class of unsaturated compounds comprises arylolefins including styrene, various alkylstyrenes such as alpha-methylstyrene, p-divinylbenzene, etc., p-chlorostyrene, p-methoxystyrene, vinylnaphthalene and similar derivatives thereof. Still another class of unsaturated substances comprises acrylic and substituted acrylic acids and their esters, nitriles and amides including acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide, etc. Still other unsaturated substances include methyl isopropenyl ketone, methyl vinyl ketone, methyl vinyl ether, vinyl ethynyl alkyl carbinols, vinyl acetate, vinyl chloride, vinylidene chloride, trichloroethylene, vinylfuran, vinylcarbazole, vinylpyridine, vinylacetylene, etc., as well as other unsaturated hydrocarbons, esters, alcohols, acids, ethers, etc.

The specific classes of compounds hereinbefore set forth are especially susceptible to polymerization upon standing, during transportation and particularly during heating. However, monoolefinic hydrocarbons including ethene, propene, butene, pentene, hexene, etc. also undergo polymerization when heated or allowed to stand for a long time, and the novel method of the present invention may be used to inhibit such polymerization.

Regardless of the specific unsaturated compounds containing an ethylenic linkage, which also may be referred to as monomers, olefinic compounds, ethylenic compounds, vinyl compounds, etc., polymerization thereof is retarded by incorporating therein the novel polymerization inhibitor of the present invention.

In one embodiment the present invention relates to a method of stabilizing against polymerization a polymerizable unsaturated substance containing an olefinic linkage which comprises incorporating in said substance an inhibitor comprising a soluble quaternary ammonium borohydride.

In a specific embodiment the present invention relates to a method of stabilizing styrene against polymerization which comprises incorporating therein a stabilizing concentration of cetyltrimethylammonium borohydride.

In another embodiment the present invention relates to a method of stabilizing methyl methacrylate against polymerization which comprises incorporating therein a stabilizing concentration of tricaprylmethylammonium borohydride.

In still another embodiment the present invention relates to a polymerizable unsaturated substance containing an ethylenic linkage and also containing a soluble quaternary ammonium borohydride.

The novel polymerization inhibitor of the present invention is a soluble quaternary ammonium borohydride and may be illustrated by the following general formula:

$$R_4N:BH_4$$

where each of the R groups is independently selected from hydrocarbyl groups. The hydrocarbyl groups generally will each contain from about 1 to about 24 carbon atoms. In another embodiment up to 3 of the R groups may be interconnected as members of a single ring system.

The total number of carbon atoms in the R groups generally is within the range of from about 10 to about 50 carbon atoms and preferably is within the range of from about 15 to about 30 carbon atoms. Illustrative quaternary ammonium borohydrides include dodecyltrimethylammonium borohydride,
tridecyltrimethylammonium borohydride,
tetradecyltrimethylammonium borohydride,
pentadecyltrimethylammonium borohydride,
hexadecyltrimethylammonium borohydride,
heptadecyltrimethylammonium borohydride,
octadecyltrimethylammonium borohydride,
nonadecyltrimethylammonium borohydride,
eicosyltrimethylammonium borohydride,
heneicosyltrimethylammonium borohydride,
docosyltrimethylammonium borohydride,
tricosyltrimethylammonium borohydride,
tetracosyltrimethylammonium borohydride,
pentacosyltrimethylammonium borohydride,
hexacosyltrimethylammonium borohydride,
heptacosyltrimethylammonium borohydride,
octacosyltrimethylammonium borohydride,
nonacosyltrimethylammonium borohydride,
triacontyltrimethylammonium borohydride,
hentriacontyltrimethylammonium borohydride,
dotriacontyltrimethylammonium borohydride,
tritriacontyltrimethylammonium borohydride,
tetratriacontyltrimethylammonium borohydride,
pentatriacontyltrimethylammonium borohydride, etc.,
diheptyldimethylammonium borohydride,
dioctyldimethylammonium borohydride, dinonyldimethylammonium borohydride,
didecyldimethylammonium borohydride,
diundecyldimethylammonium borohydride,
didodecyldimethylammonium borohydride,
ditridecyldimethylammonium borohydride,
ditetradecyldimethylammonium borohydride, etc.,
triamylmethylammonium borohydride,
trihexylmethylammonium borohydride,
trihepetylmethylammonium borohydride,
trioctylmethylammonium borohydride,
trinonylmethylammonium borohydride, etc.,
ethylundecyldimethylammonium borohydride,
propylundecyldimethylammonium borohydride,
butylundecyldimethylammonium borohydride,
amylundecyldimethylammonium borohydride,
hexylundecyldimethylammonium borohydride,
heptylundecyldimethylammonium borohydride,
octylundecyldimethylammonium borohydride,
nonylundecyldimethylammonium borohydride,
decylundecyldimethylammonium borohydride, etc.,
ethyldodecyldimethylammonium borohydride,
propyldodecyldimethylammonium borohydride,
butyldodecyldimethylammonium borohydride,
amyldodecyldimethylammonium borohydride,
hexyldodecyldimethylammonium borohydride,
heptyldodecyldimethylammonium borohydride,
octyldodecyldimethylammonium borohydride,
nonyldodecyldimethylammonium borohydride,
decyldodecyldimethylammonium borohydride, etc.,
butyldecyldimethylammonium borohydride,
amyldecyldimethylammonium borohydride,
hexyldecyldimethylammonium borohydride,
heptyldecyldimethylammonium borohydride,
octyldecyldimethylammonium borohydride,
nonyldecyldimethylammonium borohydride, etc.,
amylnonyldimethylammonium borohydride,
hexylnonyldimethylammonium borohydride,
heptylnonyldimethylammonium borohydride,
octylnonyldimethylammonium borohydride, etc.,
hexyloctyldimethylammonium borohydride,
heptyloctyldimethylammonium borohydride, etc.

In some cases the alkyl groups will be derived from fatty acids and thus the alkyl group is selected from capryl, lauryl, myristyl, cetyl, stearyl, arachidic, behenic, lignoceric, cerotic, etc. It is understood that the alkyl group may be straight chain or may contain branching in the chain. As hereinbefore set forth, two or three of the R groups may comprise a single ring system as illustrated by such compounds as cyclohexyldiethylammonium borohydride, cycloheptyldipropylammonium borohydride, cyclooctyldimethylammonium borohydride, cyclobutyldipentylammonium borohydride, cyclopropyldinonylammonium borohydride, etc. It is understood that the different quaternary ammonium borohydrides are not necessarily equivalent in the same or different substrates, but all of them will serve to retard polymerization of unsaturated organic substances containing an ethylenic linkage.

The quaternary borohydride is prepared in any suitable manner. In one method it is prepared by the reaction of tetralkylammonium hydroxide or tetralkylammonium salts of inorganic and organic acids with an alkali metal borohydride in the presence of polar solvents. This reaction proceeds metathetically at low or moderate temperature in the presence of the solvent. Illustrative solvents include water, liquid organic amines such as triethylamine, trimethylamine, triisopropylamine, aliphatic alcohols such as methyl, ethyl, propyl, isopropyl and butyl alcohols, amides such as formamide, etc. When water is used, it may be rendered alkaline by the addition of alkaline material such as a quaternary ammonium hydroxide or an alkali metal hydroxide to reduce or prevent the liberation of hydrogen by reaction with the alkali metal borohydride.

The quaternary ammonium borohydride is used in a small but sufficient concentration to retard polymerization of the unsaturated substance containing an ethylenic linkage. In general, the concentration is within the range of from about 0.001% to about 2% and preferably from about 0.01% to about 1% by weight of the unsaturated substance. The inhibitor is added in any suitable manner. When the inhibitor is a solid, it may be added as such or first formed as a solution in a suitable solvent and then incorporated into the unsaturated substance. However, the solvent must be one that will not interfere with the subsequent use of the unsaturated substance and thus in one embodiment, a solvent of a boiling range different from the unsaturated substance is used so that the solvent eventually is separated from the unsaturated substance by fractionation. However, the solvent generally is used in such a small concentration as compared to the unsaturated substance that the presence of the solvent generally should not be objectionable.

The following examples are introduced to illustrate further the novelty and utility of the present invention but not with the intention of unduly limiting the same.

*Example I*

The unsaturated substance of this example is styrene. A freshly distilled sample of styrene was maintained at 90° C. for 10 hours in a round bottom flask fitted with a reflux condenser open to the atmosphere. It was found that the styrene underwent 40% polymerization. The extent of polymerization in these examples was determined by fractional distillation and refractive index or gas-liquid chromatographic analysis where applicable.

0.2% by weight of cetyltrimethylammonium borohydride was added to another sample of the freshly distilled styrene and the solution was maintained at 90° C. for 10 hours in the same manner as the uninhibited sample described above. However, the sample of styrene containing the cetyltrimethylammonium borohydride was essentially unchanged after 10 hours at 90° C. It will be seen that the inhibitor was very effective in preventing polymerization of styrene.

*Example II*

The inhibitor of this example is tricaprylmethylammonium borohydride and, when evaluated in another sample of the styrene described in Example I, resulted in 14% by weight of polymer after 10 hours at 90° C. It will be seen that this inhibitor reduced the polymerization from 40% to 14%. However, this inhibitor is not as effective as the inhibitor of Example I and, therefore, the inhibitor of Example I preferably is used for preventing polymerization of styrene.

*Example III*

The unsaturated substance of this example is methyl methacrylate. When freshly distilled methyl methacrylate was maintained at 90° C. in the same manner as described in Example I, 28% had been converted to a hard, vitreous resin after only 7 hours.

Another sample of the freshly distilled methyl methacrylate was stabilized by the addition of 0.2% by weight of cetyltrimethylammonium borohydride. After 49 hours at 90° C., no change was noted in the sample. Here again it will be seen that this inhibitor was very effective in preventing polymerization of the unsaturated substance.

*Example IV*

The unsaturated substance of this example is 2-vinylpyridine. Polymerization during storage of the vinylpyridine is inhibited by incorporating therein 0.05% by weight of stearyltrimethylammonium borohydride.

*Example V*

The unsaturated substance of this example is vinyl chloride. Polymerization of the vinyl chloride during storage is prevented by incorporating therein 0.1% by weight of trilaurylmethylammonium borohydride.

*Example VI*

The unsaturated substance of this example is decyl vinyl ether. Polymerization thereof during storage is inhibited by incorporating therein 0.08% by weight of heneicosyltrimethylammonium borohydride.

I claim as my invention:

1. A method of stabilizing against polymerization a polymerizable unsaturated monomer containing an ethylenic linkage which comprises incorporating therein from about 0.001% to about 2% by weight of a soluble quaternary ammonium borohydride of the formula $R_4N:BH_4$ in which each R is a hydrocarbyl group of from 1 to about 24 carbon atoms and the total number of carbon atoms in the R groups is from about 10 to about 50.

2. A method of stabilizing styrene against polymerization which comprises incorporating in said styrene from about 0.001% to about 2% by weight of cetyltrimethylammonium borohydride.

3. A polymerizable unsaturated monomer containing an ethylenic linkage also containing, as an inhibitor against polymerization, from about 0.001% to about 2% by weight of a soluble quaternary ammonium borohydride of the formula $R_4N:BH_4$ in which each R is a hydrocarbyl group of from 1 to about 24 carbon atoms and the total number of carbon atoms in the R groups is from about 10 to about 50.

4. The composition of claim 3 wherein said quaternary ammonium borohydride contains from about 15 to about 30 carbon atoms.

5. Styrene containing from about 0.001% to about 2% by weight of cetyltrimethylammonium borohydride.

6. Styrene containing, as an inhibitor against polymerization, from about 0.001% to 2% by weight of a soluble quaternary ammonium borohydride of the formula $R_4N:BH_4$ in which each R is a hydrocarbyl group of from 1 to about 24 carbon atoms and the total number of carbon atoms in the R groups is from about 10 to about 50.

7. Methyl methacrylate containing from about 0.001% to about 2% by weight of cetyltrimethylammonium borohydride.

8. Methyl methacrylate containing, as an inhibitor against polymerization, from about 0.001% to about 2% by weight of a soluble quaternary ammonium borohydride of the formula $R_4N:BH_4$ in which each R is a hydrocarbyl group of from 1 to about 24 carbon atoms and the total number of carbon atoms in the R groups is from about 10 to about 50.

9. Vinyl decyl ether containing from about 0.001% to about 2% by weight of cetyltrimethylammonium borohydride.

10. Vinyl halide containing, as an inhibitor against polymerization, from about 0.001% to about 2% by weight of a soluble quaternary ammonium borohydride of the formula $R_4N:BH_4$ in which each R is a hydrocarbyl group of from 1 to about 24 carbon atoms and the total number of carbon atoms in the R groups is from about 10 to about 50.

11. Vinyl chloride containing from about 0.001% to about 2% by weight of tricaprylmethylammonium borohydride.

12. Vinyl pyridine containing, as an inhibitor against polymerization, from about 0.001% to about 2% by weight of a soluble quaternary ammonium borohydride of the formula $R_4N:BH_4$ in which each R is a hydrocarbyl group of from 1 to about 24 carbon atoms and the total number of carbon atoms in the R groups is from about 10 to about 50.

13. 2-Vinyl pyridine containing from about 0.001% to 2% by weight of cetyltrimethylammonium borohydride.

References Cited by the Examiner

UNITED STATES PATENTS

| | | | |
|---|---|---|---|
| 2,257,194 | 9/1941 | Rosen | 252—400 XR |
| 2,678,949 | 5/1954 | Banus et al. | 260—567.6 |
| 2,738,369 | 3/1956 | Banus et al. | 260—567.6 |
| 3,037,985 | 6/1962 | Lang et al. | 260—290 |

WALTER A. MODANCE, *Primary Examiner.*